March 17, 1959     A. M. ROCKWELL     2,877,817
THREADED INSERT HAVING LUGS BENT INTO SLOTTED LOCKING RING
Filed Jan. 5, 1956
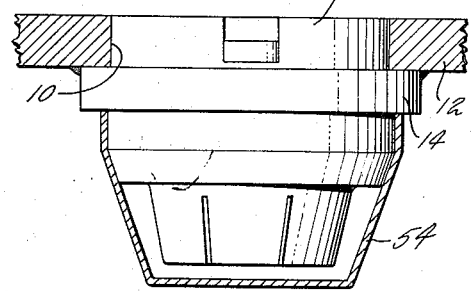
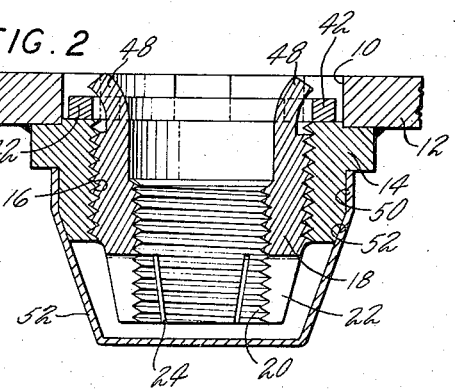
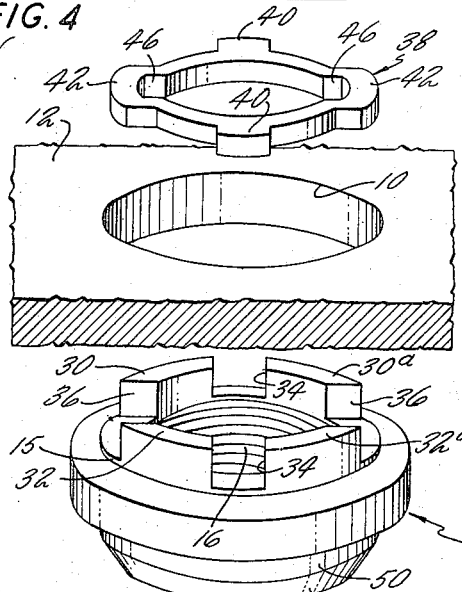
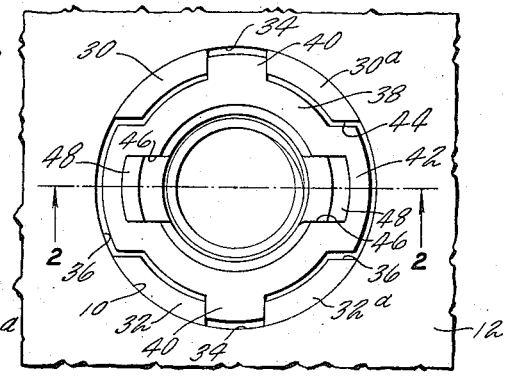
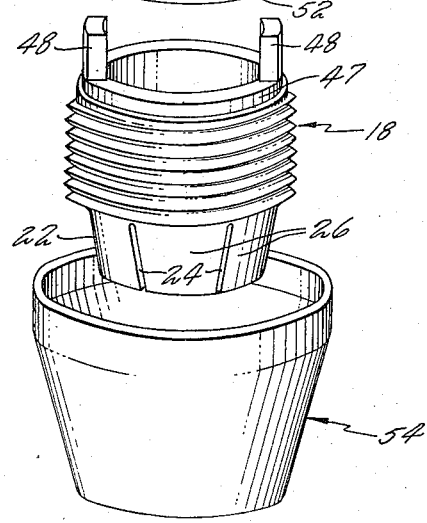
INVENTOR
ALBERT M. ROCKWELL
BY
ATTORNEY United States Patent Office 2,877,817
Patented Mar. 17, 1959

2,877,817

THREADED INSERT HAVING LUGS BENT INTO SLOTTED LOCKING RING

Albert M. Rockwell, Glastonbury, Conn., assignor to United Aircraft Corporation, East Hartford, Conn., a corporation of Delaware Application January 5, 1956, Serial No. 557,589

8 Claims. (Cl. 151—5)

This invention relates to inserted nuts of the type adapted to be threaded into a casing at an opening therein and to receive the threaded end of a cap screw, stud, or the like.

A principal object of the invention is to provide improved means for locking such nut inserts against rotation relative to the casing.

It frequently happens that the location of the casing carried parts of the locking means is established early in the fabrication process of the casing while the threads for receiving the insert are cut in the final machining of the casing and may be eccentric with respect to the locking parts on the casing.

It is another object of this invention to provide means for locking such inserts which permits the inserts to have considerable axial misalignment with respect to the axis of the casing openings, yet which holds the inserts to a minimum of rotational movement once they are locked.

Still another object of this invention is to provide a threaded insert which can be easily replaced in the event of damage to the threads by the bolt.

A further object of the invention is generally to improve the construction and performance of locked inserts of this general type.

These and other objects and advantages of the invention will become evident from the following detailed description of a preferred embodiment of the invention shown in the accompanying drawing.

In this drawing:

Fig. 1 is a side elevation of a locking insert embodying this invention mounted in a casing with the cover member for the insert shown in section;

Fig. 2 is a sectional side elevation taken on line 2—2 of Fig. 3;

Fig. 3 is a plan view of the structure of Fig. 1; and

Fig. 4 is a exploded perspective view showing the several parts of the insert assembly.

Referring to this drawing, an insert assembly embodying this invention is shown at opening 10 in a casing 12. A bushing 14 is welded to the inner side of casing 12 and has internal threads 16 in which insert 18 is threaded.

Insert 18 comprises a tubular sleeve having external threads which are received in the thread 16 of bushing 14 and internal threads 20 adapted to receive the threaded end of a cap screw, stud or the like (not shown). Insert 18 has a locking portion 22 at one end which extends beyond the extremity of bushing 14 and has a plurality of circumferentially spaced kerfs 24 extending longitudinally into the end portion 22 of the insert to provide stud gripping tabs 26, it being understood that the material of the insert is sufficiently resilient to cause these tabs when suitably preset inwardly to grip the threaded end of a stud or cap screw which is threaded into the insert and prevent rotational displacement of the stud.

In the manufacture of an engine casing, for example, a large number of these inserts may be involved and considerable difficulty is experienced in getting the inserts accurately located with respect to the holes 10 in the casing. The diameter of the holes 10 is determined early in the fabrication of the casing whereas the final boring and threading of the bushing 14 is done in the final machining of the casing. Thus, it frequently happens that the inserts 18 are considerably off location with respect to the holes 10 and considerable difficulty is experienced in locking the inserts to the casing with easily removable locks under these conditions while still holding the insert against appreciable rotational movement under conditions of vibration which would relax the tension of the fastening means threaded into the insert.

To this end, means are provided which are capable of locking the inserts against any appreciable rotational movement relative to the casing in any number of positions of considerable axial misalignment of the insert relative to the axis of the hole 10 in the casing.

Bushing 14 is provided with an upstanding annular flange, or collar, 15 which extends within and locates the bushing in hole 10 and, as shown herein, is co-extensive with the thickness of casing 12. This collar is slotted on two diameters which are at right angles to each other to provide four upstanding lugs 30, 30a, 32 and 32a separated by a narrow slot 34 cut on one diameter and a wider slot 36 cut on the other diameter.

A locking ring 38 is provided for locking the insert 18 to the bushing 14. This ring, which lies in the opening 10 in the horizontal planes including the lugs of bushing 14, has diametrically opposite tabs, or keys, 40 which are closely received in slot 34. The ring also has two diametrically opposite tabs 42 which are loosely received in the slot 36, the tabs 42 being narrower than the slot 36 so that the ring is free to move laterally in either direction through a distance equal to the space 44 shown in Fig. 3 on either side of the tab 42. It will also be noted that the annular portions of ring 38 are somewhat smaller in diameter than the internal diameter of collar 15 from which lugs 30, 30a, 32 and 32a are formed, permitting this lateral movement of the ring relative to the bushing 14 during which the tabs 40 slide in slot 34.

Tabs 42 of the locking ring are also provided with internal slots 46 which are diametrically opposed and are adapted to receive closely a pair of upstanding lugs, or keys, 48 formed integral with the insert 18 on the reduced diameter end portion 47 thereof above the exterior threaded portion of the insert. These lugs have a width which is a close fit in the slots 46 and are adapted to be upset or bent outwardly by a suitable tool into the position shown in Fig. 2 in which they enter into and closely engage the side walls of the slots 46. It will also be noted that the upper reduced diameter portion 47 of the insert, including the upstanding lugs 48, has a smaller diameter than the inner annular diameter of locking ring 38 so that the locking ring is free at all times to move laterally relative to both insert 18 and bushing 14.

Bushing 14 has an external cylindrical portion 50 and a connecting conical portion 52 which are adapted to receive a cover member 54 if desired to form a closure for the inner end of bushing 14 and thus enclose the inner end of the insert.

It will be evident that the insert structure above described will take care of considerable axial misalignment of an insert relative to the hole location in the casing. The locking ring 38, with its tabs 40 slidable laterally in slot 34 in bushing 14 and the insert with its lugs 48 slidable laterally in slots 46 at right angles to slot 34, provides in effect an Oldham coupling. The Oldham coupling is well recognized for its ability to transmit torque from one part to another part whose axes are essentially parallel to but not in alignment. The principle of the Oldham coupling is used herein to hold insert 18 against turning movement relative to bushing 14 under conditions of axial misalignment of the insert and the bushing. It will be understood that by providing tabs 40 which can slide on the diameter of slot 34 and lugs 48 which can slide on the diameter of slots 46 the locking ring of this invention can take care of misalignments on either of these diameters and also any combination of the two movements on any other diameter intermediate thereto. By providing an accurate fit between the width of tabs 40 and slot 34 and between the width of lugs 48 and slots 46, the locking device of this invention is enabled to lock the insert against rotation relative to the casing in any position of axial misalignment encountered in normal manufacturing procedures.

It will also be evident that if the internal threads 20 of the insert are damaged in use the insert can be readily removed and replaced by a new one from the exterior of the casing 12. To remove the damaged insert it is only necessary to bend the lugs 48 inwardly until they clear slots 46 in the locking ring 38. The lugs can then be used to unscrew the insert from bushing 14. The new insert can be threaded into the bushing, using the lugs 48, after which the lugs are bent outwardly into slots 46 to lock the insert positively in place in the bushing.

It will be noted that there are only two unattached parts in this improved insert structure, the insert 18 and the locking ring 38. When the lugs 48 are bent outwardly into slots 46 the locking ring prevents rotation of the insert and the prongs lock the ring against axial displacement.

While only one embodiment of the invention has been shown herein for purposes of illustration, it will be understood that various modifications of this structure are possible without departing from the scope of the invention.

I claim:

1. In combination, a casing member having an aperture for a threaded stud or the like, an internally threaded bushing fixed to said member about said aperture having radial slots cut in one of its ends which lie on two different diameters of said bushing at right angles to each other, an externally threaded insert received in said threaded bushing and having a bore threaded to receive the stud, said insert having at least one peripheral lug on the end thereof corresponding to the slotted end of said bushing, and means for locking said insert to said bushing in a plurality of positions of axial misalignment of the two including a locking ring loosely surrounding the end of said insert which carries said lug, said ring having a key which lies in and is the same width as the slot in one diameter of said bushing and a second key which lies in and is narrower than the slot in said bushing on the other diameter, said second key having an internal radial slot which is the same width as and registers with said lug on said insert into which said lug is adapted to be bent to lock said ring against axial displacement and to lock said insert against rotation relative to said bushing.

2. In combination, a casing member having an aperture for a threaded stud or the like, an internally threaded bushing fixed to said casing member about said aperture having radial slots cut in one end which lie on two different diameters at right angles to each other, an externally threaded insert received in said threaded bushing having a bore threaded to receive the stud, said insert having two diametrically opposite lugs on the end thereof corresponding to the slotted end of said bushing, and means for locking said insert to said bushing in a plurality of positions of axial misalignment of the two including a locking ring surrounding the end of said insert which carries said lugs and loosely received between spaced annular surfaces on said bushing and insert, said ring having a pair of radially extended keys which lie in and are the same width as the slots in said bushing which lie on one diameter thereof and a second pair of keys which lie in and are narrower than the slots in said bushing which lie on said other diameter, said second keys having internal radial slots which are the same width as and register with said lugs on said insert into which said lugs are adapted to be bent to lock said ring against axial displacement from the slots in said bushing and said insert against rotation relative to said bushing.

3. In combination, a casing member having an aperture for a threaded stud or the like, an internally threaded bushing fixed to one side of said casing member about said aperture having an upstanding radially slotted collar in said aperture, the slots of said collar lying in two different diameters of said bushing which are at right angles to each other, an externally threaded insert received in said threaded bushing and having a bore threaded to receive the stud, one end of said insert having peripherally spaced longitudinal kerfs cut therein to provide a plurality of end tabs for frictionally engaging the end of said stud, the other end of said insert having two diametrically opposite lugs, and means for locking said insert to said bushing against relative rotational movement in a plurality of positions of axial misalignment thereof including a locking ring loosely received between said lugs on said insert and said collar on said bushing, said ring having two radial keys extended laterally into and closely fitting two slots in one diameter of said bushing and two radial keys extended laterally into and loosely fitting two slots in the other diameter of said bushing, said latter pair of keys having internal slots which lie in said other diameter and are the same width and register with said lugs on said insert into which said lugs are adapted to be bent to lock said ring and said insert against displacement.

4. In combination, a casing member having an aperture in a wall thereof for a threaded stud or the like, an internally threaded bushing fixed to the inner surface of said wall about said aperture having an annular flange extended into said aperture, said flange having radial slots therein on two different diameters of said bushing at right angles to each other, an externally threaded insert threaded into said bushing having a bore threaded to receive the stud, said insert having at least one bendable lug adjacent said flange, and means for locking said insert to said bushing including a locking ring having its outer circumference loosely received within said flange and having keys located in said radial slots, said ring having an internal slot into which said lug is adapted to be bent to lock said ring and said insert against displacement.

5. In combination, a casing member having an aperture in a wall thereof for a threaded stud or the like, an internally threaded bushing fixed to the inner surface of said wall about said aperture having an annular flange extended into said aperture, said flange having radial slots therein on two different diameters of said bushing at right angles to each other, an externally threaded insert adapted to be passed through said aperture from the exterior of said casing member and threaded into said bushing, said insert having a bore threaded to receive the stud, said insert also having a pair of opposed bendable lugs adjacent said flange, and means accessible from the outer side of said casing member for locking said insert to said bushing including a locking ring loosely received in said aperture between the lugs on said insert and the flange on said bushing and having external keys located in said radial slots, said ring having opposed internal slots into which said lugs are adapted to be bent to lock said ring in said aperture and to lock said insert against rotation in said bushing.

6. A locking insert assembly for use in a stud receiving casing aperture including an internally threaded bushing adapted to be fixed to the casing about the aperture therein, said bushing having an annular flange extended into said aperture having radial slots therein on two different diameters of said bushing at right angles to each other, an externally threaded insert adapted to be threaded into said bushing having a bore threaded to receive the stud, said insert having two opposed bendable lugs at one end, and means for locking said insert against rotation in said bushing including a locking ring loosely received in said aperture between the lugs on said insert and the flange on said bushing and having external keys received in said radial slots, said ring also having opposed internal slots into which said lugs are adapted to be bent to lock said ring to said bushing and to lock said insert against rotation relative thereto.

7. A locking insert assembly including an internally threaded bushing adapted to be fixed to a supporting member about a stud receiving aperture therein, said bushing having radial slots at one end thereof on two different diameters of the bushing at right angles to each other, an externally threaded insert threaded into said bushing and having a bore threaded to receive the stud, said insert having two bendable lugs at one end thereof adjacent the slotted end of said bushing, and means for locking said insert to said bushing including a locking ring loosely received between annular surfaces on said insert and said bushing and having keys located in said radial slots, said ring also having opposed internal slots into which said lugs are adapted to be bent to lock said ring against axial displacement from said bushing and to lock said insert against rotation relative to said bushing.

8. A locking insert assembly including an internally threaded bushing adapted to be fixed to a casing member about a stud receiving aperture therein, said bushing projecting at one end into said casing and at its other end having radial slots therein accessible from outside said casing, said slots lying on two diameters of said bushing at right angles to each other, an externally threaded insert threaded into said bushing having a bore threaded to receive the stud, said insert having bendable lugs adjacent the slots in said bushing, means for locking said insert to said bushing including a locking ring loosely received between annular surfaces on said insert and said bushing and having external keys located in said radial slots and also having opposed internal slots into which said lugs are adapted to be bent to lock said ring against axial displacement from said bushing and to lock said insert against rotation relative to said bushing, and means forming a closure for said stud receiving aperture comprising a cap member enclosing the projecting end of said bushing.

References Cited in the file of this patent

UNITED STATES PATENTS

| | | |
|---|---|---|
| 719,559 | Brown | Feb. 3, 1903 |
| 1,016,146 | Hawes | Jan. 30, 1912 |
| 1,308,505 | Parker | July 1, 1919 |
| 1,572,255 | Uhl | Feb. 9, 1926 |
| 1,755,807 | Boles | Apr. 22, 1930 |
| 2,455,885 | Theurer | Dec. 7, 1948 |
| 2,742,938 | Neuschotz | Apr. 24, 1956 |